United States Patent [19]
Park et al.

[11] Patent Number: 5,386,412
[45] Date of Patent: Jan. 31, 1995

[54] TELECOMMUNICATION SYSTEM PROTOCOL FOR ASYNCHRONOUS DATA COMMUNICATION BETWEEN MULTIPORT SWITCH CONTROL PROCESSOR AND INFORMATION SUPPORT PERSONAL COMPUTER TERMINAL

[76] Inventors: Jung S. Park, 5148 W. Byron St., Chicago, Ill. 60641; Raymond G. Johns, Jr., 1682 E. Monticello Ct., Wheaton, Ill. 60187

[21] Appl. No.: 60,381

[22] Filed: May 11, 1993

[51] Int. Cl.⁶ .................. H04L 29/02; H04M 3/00
[52] U.S. Cl. ...................... 370/53; 370/58.2; 370/82; 370/110.1; 371/33
[58] Field of Search ............... 370/53, 58.1, 58.2, 370/60, 60.1, 79, 82, 110.1, 105, 95.1, 85.7, 85.14; 371/32, 33; 178/401 C; 395/500; 379/229, 230, 268, 269, 310

[56] References Cited

U.S. PATENT DOCUMENTS

| | | | |
|---|---|---|---|
| 4,439,859 | 3/1984 | Donnan | 371/30 |
| 4,830,685 | 2/1989 | Oget | 371/33 |
| 4,999,834 | 3/1991 | Leo et al. | 371/32 |
| 5,040,176 | 8/1991 | Barzilai et al. | 370/110.1 |
| 5,182,751 | 1/1993 | Bales et al. | 370/110.1 |
| 5,222,061 | 6/1993 | Doshi et al. | 370/60 |
| 5,235,592 | 8/1993 | Cheng et al. | 370/60 |
| 5,245,616 | 9/1993 | Olson | 370/60 |
| 5,247,520 | 9/1993 | Geise et al. | 395/500 |
| 5,280,476 | 1/1994 | Kojima et al. | 370/60.1 |
| 5,280,477 | 1/1994 | Trapp | 370/85.7 |
| 5,280,481 | 1/1994 | Chang et al. | 370/85.14 |
| 5,307,347 | 4/1994 | Duault et al. | 370/95.1 |

OTHER PUBLICATIONS

"Telecommunications Protocols and Design" John D. Spragins Addison-Wesley, 1991 pp. 618, 621 and 632.

"Data and Computer Communications" William Stallings MacMillan Publishing Co. 1988 p. 411.

*Primary Examiner*—Benedict V. Safourek
*Attorney, Agent, or Firm*—C. B. Patti; H. F. Hamann

[57] ABSTRACT

A telecommunication system (40) with a multiport switch (42) controlled by a central processing unit (44) to interconnect telephone units (48) of an external telephonic network (50) with an internal network of agent telephonic units (52) connected with the multiport switch (42) and to communicate with an information support computer terminal (56) on a single, asynchronous, data communications link (58), a communication protocol method for communicating on the communications link (58) having the steps of establishing a multi-layered compressed protocol in which the Data Link (24), Transport (28) and Session (30) layers of the OSI model (20) are combined into a single protocol layer (62), transmitting the compressed protocol on the asynchronous communication link (58), and transmitting a frame of information between the IST (56) and the telecommunication system (40), the frame having a plurality of different fields respectively associated with different types of information arranged in a preselected frame form including a frame type field (80), a channel identification field (82) including a destination channel for which the message is conveyed, a last message data identification field (96) for indicating the last message identification received, a frame sequence field (98) indicating the portion of the frame being transmitted in a sequence of frames which comprise the message identified, a message identification field (94) for identifying the message with which the frame being transmitted is associated, a size field (105) indicating the size of the data field (108), and a frame check sequence field (110) indicating information to check for accurate receipt of the message.

33 Claims, 14 Drawing Sheets

Fig. 1
PRIOR ART
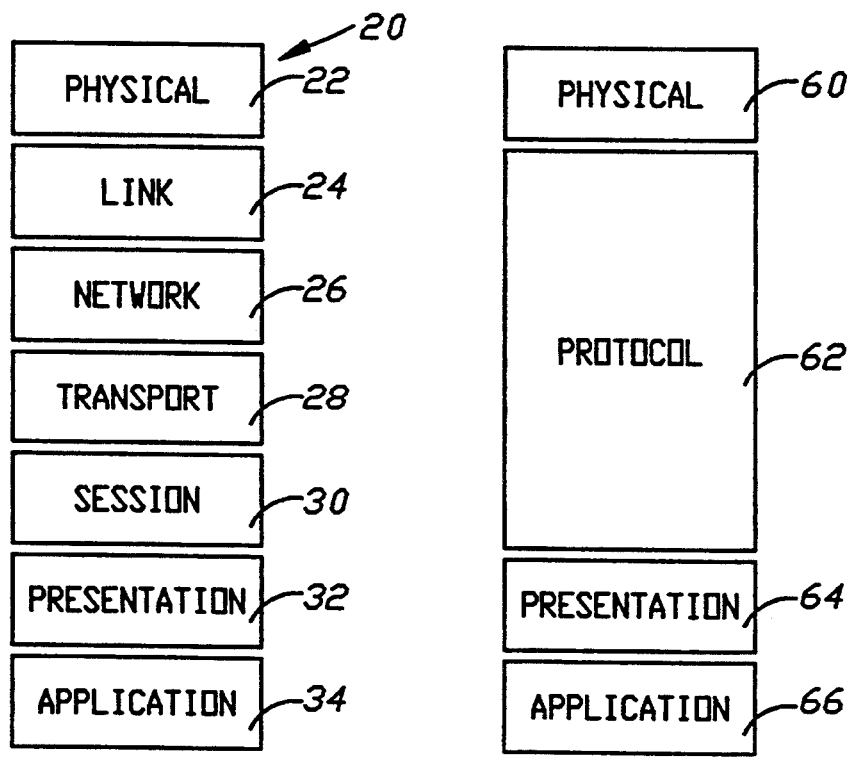
Fig. 3A
Fig. 4
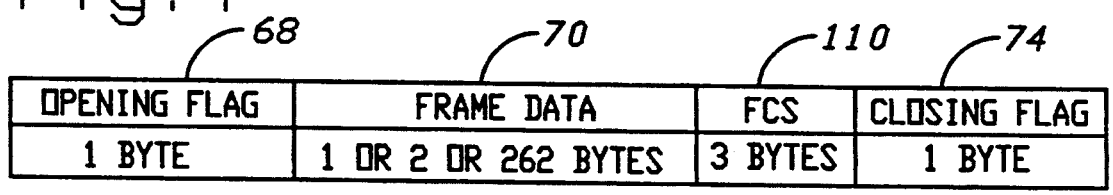
Fig. 5
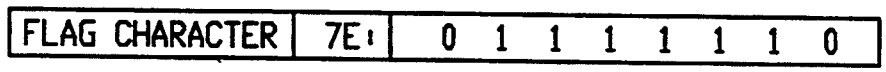

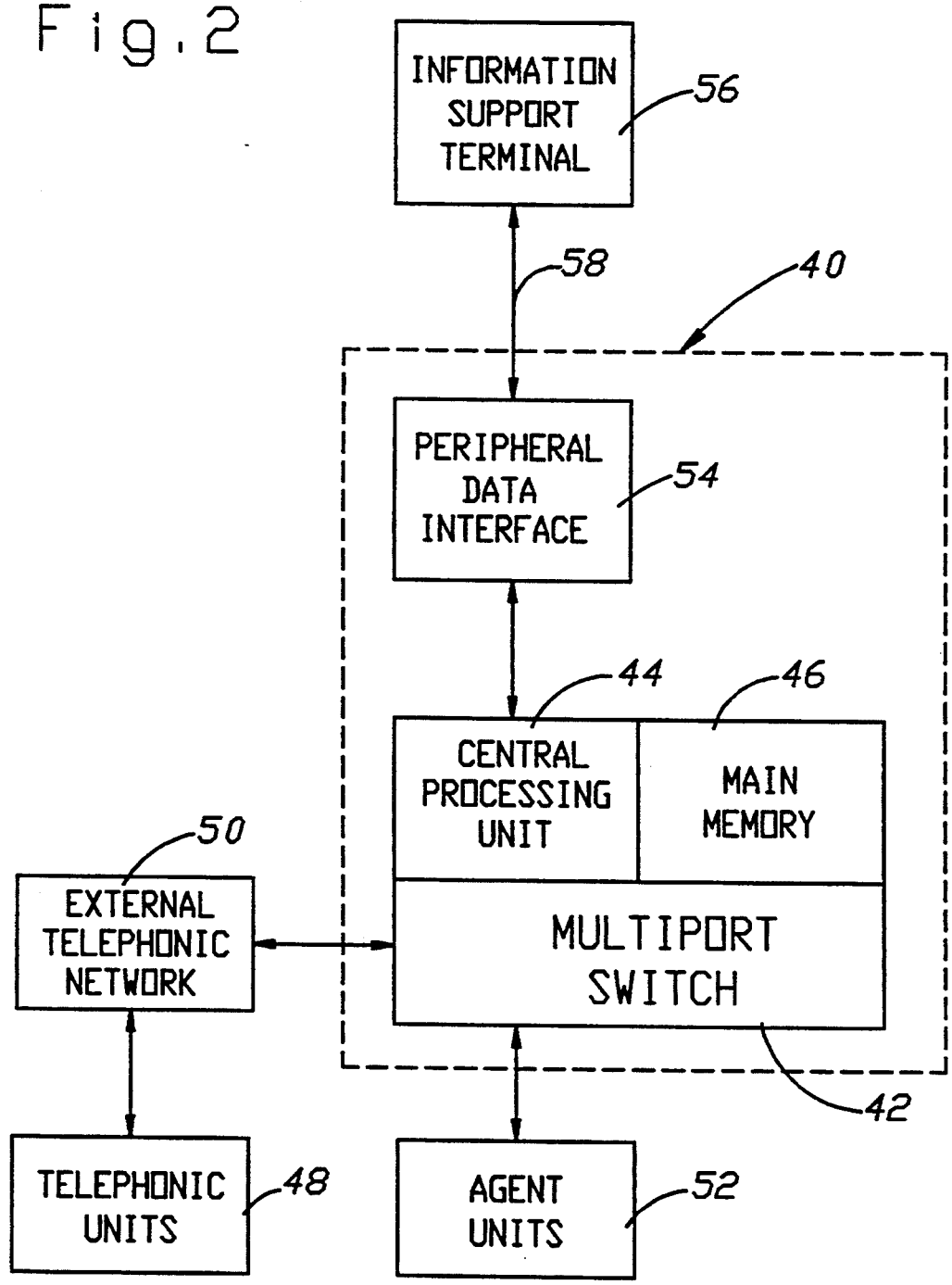

Fig.6

| FRAME DATA | | |
|---|---|---|
| CONTROL (1 BYTE) | | |
| TYPE | | CH_ID |
| 11 | 000 (SABM) | 000 |
| 11 | 001 (UA) | 000 |
| 11 | 010 (DISC) | 000 |

Fig.7

| FRAME DATA | | | | |
|---|---|---|---|---|
| CONTROL (2 BYTES) | | | | |
| TYPE | | CH_ID | | ACK_MID |
| 11 | 011(ACK) | XXX | 110000 | XX |
| 11 | 100(NACK) | XXX | 110000 | XX |

Fig.9

| FCS | | |
|---|---|---|
| BYTE0 | BYTE1 | BYTE2 |
| BITS 15-11 110XXXXX | BITS 10-6 110XXXXX | BITS 5-0 11XXXXXX |

Fig.10

| ESCAPE CHARACTER | B5: | 1 0 1 1 0 1 0 1 |
|---|---|---|

TELECOMMUNICATION SYSTEM PROTOCOL FOR ASYNCHRONOUS DATA COMMUNICATION BETWEEN MULTIPORT SWITCH CONTROL PROCESSOR AND INFORMATION SUPPORT PERSONAL COMPUTER TERMINAL

BACKGROUND OF THE INVENTION

1. Field of the Invention

This invention relates generally to a method of communicating between devices in a telecommunication system and, more particularly, to a communication protocol for asynchronous data communications.

2. Description of the related art including information disclosed under 37 CFR 1.97–1.99

Telecommunication systems having a multiport switch controlled by a central processing unit to interconnect telephone units of an external telephonic network with an internal network of agent telephonic units connected with the switch are well known. Examples of such telecommunications systems are shown in patent application U.S. Pat. No. 5,268,903 of Jones et al. entitled "Multichannel Telephonic Switching Network With Different Signaling Formats and Connect/PBX Treatment Selectable For Each Channel", filed Oct. 2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

In such telecommunication systems, cathode ray tube (CRT) terminals are often connected to the central processing unit to receive data from the telecommunication system to display at a remote location. The CRT terminals used in these known systems are "dumb" and therefore have no processing or programming capabilities. All processing is done at the central processing unit of the telecommunication system. Disadvantageously, this limits the processing capabilities of the telecommunication system.

Therefore, in many known telecommunication systems distributed computer processing schemes are used in which the processing of information is performed at remote computing devices and the resultant data is sent to the central processing unit. Distributed processing is often desirable, since each remote computing device can be devoted to perform specific applications, and efficient use of computer processing power is achieved. However, it is nearly impossible for computer based devices from different vendors to communicate without a standard set of rules to follow for transmitting data.

Accordingly, in such telecommunications systems it is also known to communicate according to a preselected protocol which specify how the communicating devices initiate calls, terminate calls and transmit data between each other. Only computer based devices which have the same communication protocol or method of communicating are able to communicate with each other. Thus, the International Standards Organization (ISO) has established the Open Systems Interconnection (OSI) standard protocol in order to develop an internationally accepted standard framework for communication between data communication devices made from different vendors.

Referring to FIG. 1, the OSI reference model 20 of the prior art is arranged into seven layers. The seven layer OSI model refers to a collection of network processing functions that together comprise a set of rules and standards for successful data communication. Layer one is the physical layer 22, which performs the physical control of sending data over communications lines. Layer two is the data link layer 24, which provides the functional and procedural means to establish, maintain and release data lines between network entities. Layer three is the network layer 26 and is used for determining how data is transferred between computing devices. Layer four is the transport layer 28 which defines the rules for information exchange between devices. Layer five is the session layer 30 which manages the dialogue between the communicating devices. Layer six is the presentation layer 32 which masks the differences of the varying data formats between the dissimilar devices. Layer seven is the applications layer 34 which contains the functions for particular applications services.

X.25 is a known protocol commonly used in packet switching networks which conforms to the OSI seven layer reference model. The X.25 protocol is frequently used to enable many types of mainframe computers, minicomputers and large scale microcomputers to communicate with each other. High level Data Link Control (HDLC) is another known standard protocol. The HDLC protocol, developed by the International Standards Organization, consist of layer two of X.25. Protocols X.25 and HDLC are synchronous protocols designed for communication between devices from different vendors which transmit data synchronously.

Unfortunately, asynchronous devices, such as personal computers and workstations, typically do not support the X.25 and HDLC protocols. Therefore, these known protocols are not capable of providing data communications between a synchronous device and an asynchronous device. Personal computers having asynchronous interface characteristics are desirable as remote computing devices used in conjunction with a main central processing device in a telecommunication system because of their computing capabilities. A personal computer unlike a "dumb" CRT terminal, is capable of processing functions thereby relieving the computing load from a main central processing device in a system using distributed computer processing. Disadvantageously, the known protocols do not enable communication between a device which transmits data asynchronously such as a personal computer, and a device which transmits data synchronously.

SUMMARY OF THE INVENTION

It is therefore the principal object of the invention for providing a communication protocol for a single, asynchronous, serial data link between an information support terminal and a central processing unit employed to control a multiport switch of a telecommunication system which overcomes the problems and disadvantages of known protocols.

This object is achieved by providing in a telecommunication system with a multiport switch controlled by a central processing unit to interconnect telephone units of an external network with an internal network of agent telephonic units connected with the multiport switch and to communicate with an information support computer terminal on a single, asynchronous, data communications link, a communication protocol method for communicating on said communications link, comprising the steps of (a) establishing a multilayered compressed protocol like an OSI Model Protocol but in which functions of the OSI Model protocol layers respectively entitled Data Link, Network, Transport and Session are combined into a single protocol layer, and (b) communicating on said asynchronous communication link in accordance with the multilayered compressed protocol.

Obtainment of the object is also achieved by provision of a protocol method for such a communications link in such a telecommunication system comprising the steps of (a) transmitting a frame of information from one to the other of said central processing unit and the information support terminal and (b) selectively ignoring the frame of information at the other of the central processing unit and the information support terminal under preselected conditions.

Also, the object of the invention is obtained by providing a protocol method for such a communications link in such a telecommunication system comprising the steps of (a) transmitting an acknowledge indication in a supervisory frame in the event an incoming message is correctly received and (b) transmitting a negative acknowledgement indication in another supervisory frame if an incoming message is incorrectly received.

It is also an object to provide a protocol method for such a communications link in such a telecommunication system comprising the steps of (a) transmitting a frame of information with size bytes indicating the size of a variable size data field and (b) transmitting the frame with data within the variable size data field having a size corresponding to that indicated by the size byte.

Moreover, the object of the present invention is achieved by providing a protocol method for such a communications link in such a telecommunication system comprising the steps of (a) transmitting an informational frame of data with a message number corresponding to a single message being conveyed by a plurality of frames and (b) transmitting the informational frame of data with a message sequence number representing the position of the informational frame in the plurality of frames which comprise the message.

It is also an object to provide a protocol method for such a communications link in such a telecommunication system comprising the steps of (a) transmitting protocol information in a plurality of different types of frames and (b) transmitting the destination channel identification information identification information with the protocol information in a single frame.

An object of the invention is further achieved by providing a protocol method for such a communications link in such a telecommunication system comprising the steps of (a) transmitting a flag at the beginning of a frame of information, (b) transmitting the frame of information with a plurality of different fields respectively associated with different types of information arranged in a preselected frame format including a frame type field for identifying the frame type of the frame being transmitted, a channel identification field for indicating a destination channel to which the message is to be conveyed, a last message data identification field for indicating the last message identification received, a frame sequence field for indicating the portion of the frame being transmitted in a sequence of frames which comprise the message identified in the message field, a message identification field for identifying the message with which the frame being transmitted is associated, a size field for indicating the size of the data field, a data field having a size identified by the size field, and (c) transmitting another flag at the end of the frame of information.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1 is an illustration of the seven layers of protocol of the PRIOR ART standard OSI Model;

FIG. 2 is a functional block diagram of the preferred embodiment of the telecommunication system in which the protocol of the present invention is established for communication on an asynchronous link between the central processing unit and information support computer terminals;

FIG. 3A is an illustration of the four layers of the compressed protocol of the present invention in which layers two through five of the standard OSI seven layered model of FIG. 1 have been compressed into a single layer called the protocol layer;

FIG. 4 is an illustration of the frame format and byte sizes of opening flag, frame data, frame check sequence, and the closing flag;

FIG. 5 is an illustration of the preferred binary code for the flag characters;

FIG. 6 is an illustration of the preferred format for a link setup frame;

FIG. 7 is an illustration of the preferred format for a supervisory frame;

FIG. 9 is an illustration of the three bytes of the frame check sequence field;

FIG. 10 is an illustration of the preferred binary code for the escape character;

DESCRIPTION OF THE PREFERRED EMBODIMENT

Figure 3B:
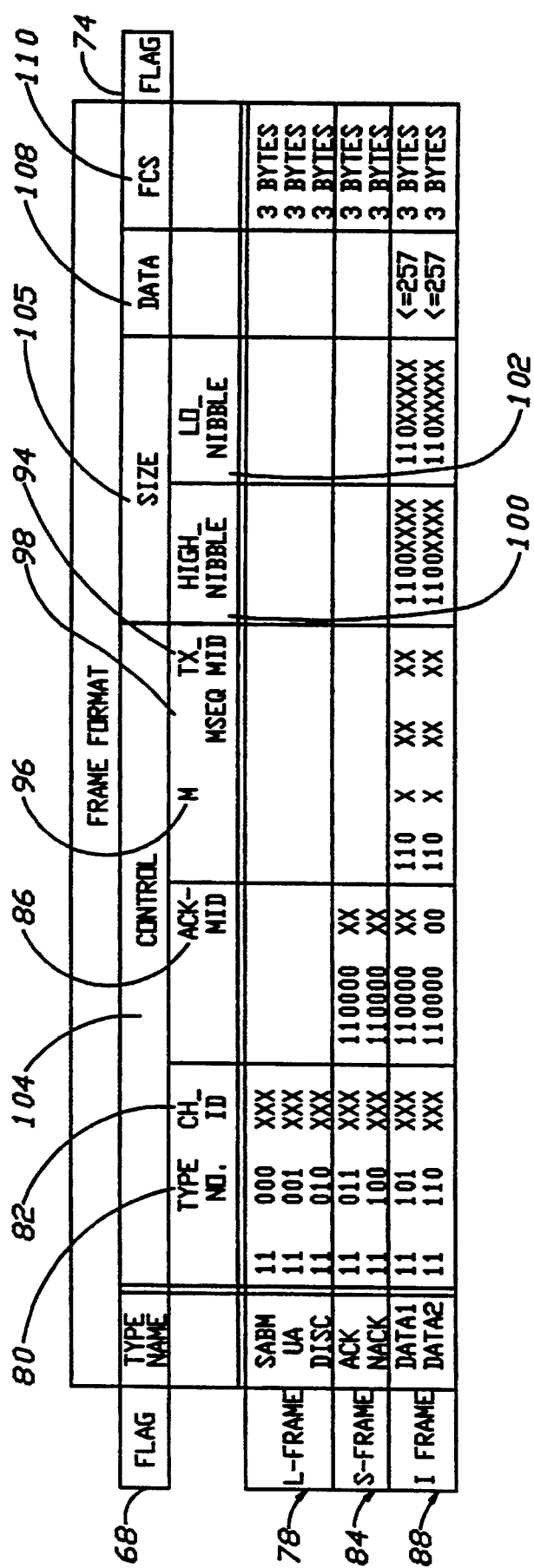
FIG. 3B is a detailed illustration of the frame format of the communications protocol of FIG. 3A.

Referring to FIG. 2, a telecommunication system 40 is shown having a multiport switch 42 controlled by a central processing unit 44 with an associated main memory 46 interconnecting telephone units 48 from an external telephonic network 50 with an internal network of agent telephonic units 52 connected with the switch. The central processing unit 44 of the telecommunication system 40 is preferably a 68030 microprocessor capable of either simplex or duplex operation. For details of the operation of the computer controlled telecommunication system 40, reference should be made to patent application U.S. Pat. No. 5,268,903 of Jones et al. entitled "Multichannel Telephonic Switching Network With Different Signaling Formats and Connect/PBX Treatment Selectable For Each Channel" filed Oct.2, 1991; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992; U.S. Pat. No. 5,127,004 of Lenihan et al. entitled "Tone and Announcement Message Code Generator for a Telephonic Switching System and Method", issued Jun. 30, 1992 and U.S. Pat. No. 4,627,047 of Pitroda et al. entitled "Integrated Voice and Data Telecommunications Switching System", issued Dec. 2, 1986.

A peripheral data interface circuit card (PDI) 54 is coupled with the central processing unit 44 of the telecommunications system 40. The PDI circuit has a Motorola 68000 microprocessor for providing the overall controlling functions of the PDI circuit. The PDI circuit 54 provides the interface mechanism between the central processing unit 44 of the telecommunications system and the information support computer terminal 56 (IST). For further details of the operation of the peripheral data interface circuit 54 reference should be made to U.S. patent application Ser. No. 07/976,131 of Kovarik filed Nov. 12, 1992 entitled "Automatic Call Distributor With A Programmable Data Window Display System and Method". The information support terminal 56 is an Intel 80386/80486 microprocessor based personal computer which communicates asynchronously. The IST 56 has a serial communication controller (not shown) for data communication over a single, asynchronous serial data communications link 58 with the dual universal serial communication controllers (not shown) of the PDI circuit 54. The information support computer terminal 56 is a window-based work station that is asynchronously connected to the telecommunication system 40 to provide an intelligent interface between the operator of the IST and the telecommunication system. The dual universal serial communications controller (DUSCC) at the PDI 54 is a single chip communications device that provides the independent, full duplex receiver/transmitter channels supporting bit and character oriented synchronous data link controls as well as asynchronous protocols. Data is transmitted at a rate between 1200 and 9600 baud on the serial data communications link 58.

Referring to FIG. 3, the layers for the preferred embodiment of the communication protocol between the IST 56 and the system 40 on the asynchronous serial data communications link 58 of the present invention is shown. Unlike the standard seven layer OSI reference model of the prior art, the framework of the present invention has four layers: the physical layer 60, the protocol layer 62, the presentation layer 64 and the application layer 66. The open systems interconnection (OSI) model layers two through five of the prior art are compressed into a single layer of information called the protocol layer 62. The protocol layer 62 specifies the frame format, transmission details and flow control governing the interface between the telecommunication system 40 and the information support terminal 56.

The IST protocol 62 employs the frame type scheme that is similar to one in the Link Layer 24, FIG. 1, of the OSI model 20 of the prior art, but with fewer frame types. The IST protocol 62, FIG. 3A, is also more compact compared to the Link Layer 24, FIG. 1, and Network Layer 26 of the OSI model 20 since it does not need to support Send Sequence Numbers (N(S) and P(S)) and Receive Sequence Number (N(R) and P(R)) in order to meet the communication requirements between the telecommunication system 40 and the information support computer terminal 56. The IST protocol 62 rather employs a message id numbering scheme and a message sequence numbering scheme along with a M bit field that are directly associated with an application message. These schemes are seen in a plurality of layers, the Network Layer 26, FIG. 1, the Transport Layer 28 or the Session Layer 30 of the OSI model 20. These schemes in a single Layer of the IST protocol 62 eliminate overhead that is maintained by Layers two through five of the OSI model. The IST protocol 62 employs other attributes that are seen in the OSI Layers two through five. These attributes are sufficient enough to meet the communication requirements between the CPU 44, FIG. 2, of the telecommunication system 40 and the information support personal computer terminal 56. For example, the Channel id field 82, FIG. 3B, and M bit field 96 of the IST protocol are seen in the Network Layer 26, FIG. 1, of the OSI model 20 of the prior art. An acknowledgement with a message id is an attribute of the Transport Layer 28 or the Session Layer 30 of the OSI model.

The primary advantage of compressing several layers into a single layer IST protocol is simplicity. The multi-layer OSI model 20, FIG. 1, of the prior art is complex and contains characteristics for very complex data communication applications. In many applications, these complex characteristics are not required. Eliminating certain characteristics reduces development time and expected maintenance costs, thereby improving efficiency and performance within the telecommunication system. The compactness of the IST protocol 62 allows performance to be increased by reducing the amount of memory buffer space and CPU cycles necessary to support a multi-layer protocol.

Flow control provided at the physical layer 60 is through RTS/CTS signals of the RS-232C standard interface. Other types of flow control is provided at the protocol layer 62 and by the applications layer 66. The protocol layer 62 continually transmits one frame over one channel and a next frame over another channel. This continual transmission scheme prevents one channel from dominating the link 58 over other channels. The application layer 66 sends the protocol layer 62 an application message of a substantial size or one block at a time.

Each character in the protocol of the present invention is ten bits wide, consisting of eight data bits, a start bit and a stop bit. Referring to FIG. 3B, as seen in the frame format, there are a total of seven frame types defined: SABM (Set Asynchronous Balanced Mode), UA (Unnumbered Acknowledgement), DISC (Disconnect), ACK (Acknowledge), NACK (Negative Acknowledge), DATA1 and DATA2. These frames are grouped into three types of frame groups: Link Setup Frames (L-frame) 78, Supervisory Frames (S-frame) 84 and Informational (data) Frames (I-frame) 88. All communication between the telecommunication system 40, FIG. 2, and the IST 56 takes place on eight logical channels. A logical channel id 82, FIG. 3B, is assigned by the applications. The applications send application messages to the protocol layer in a form of messages or blocks. The protocol layer 62, FIG. 3A, packetizes a message into frames and then transmits the frames through the channel specified with the message. The maximum size of a message is unlimited, but the maximum size of a block is 1028 bytes.

Every informational frame 88, FIG. 3B, is assigned with a message id (tx_mid) 94 and a message sequence number (mseq) 98. All frames of one message carries the same message id 94, but different message sequence numbers 98. One or more informational frames 88 make up a data block or an application message. Every new message is assigned with a new message id 94 of modulo four (range of zero–three). Every informational frame is assigned with a sequence number of modulo four (range of zero–three). A sequence number 98 is reset to zero for each new block of a new message. The message sequence number (mseq) 98, message id (tx_mid) 94, and channel id (ch_id) 82 is used to detect lost or out-of-sequence frames.

The More-bit, or M-bit, field 96, FIG. 3B, of an informational frame 88 contains a zero when this frame is the last frame of a message. The M-bit code 96 indicates whether or not the frame is the last frame of the message. The M-bit field 96 of an informational frame 88 contains one when one or more frames of a message are to come. An ACK or NACK is generated to indicate to the sending device, either IST 56, FIG. 2, or the system 40, the successful or unsuccessful reception of a block or a message by the receiver. The window size of the preferred embodiment protocol is four which is equivalent to a data block. That is, the protocol allows up to four outstanding unacknowledged frames per logical channel, regardless of the number of blocks or messages spanned. The receiving device transmits an acknowledgement to the sender whenever an I-frame 88, FIG. 3B, with more bit code 96 equal to zero is received or an I-frame with mseq 98 equal to three is received. ACK's are selectively sent along or piggybacked with I-frames 88. NACK's are not transmitted along with I-frames 88. The maximum size of the data field 108 within an I-frame 88 is two hundred fifty-seven bytes long. The bits six and seven (first two bits) of all control bytes are set to insure the control field 104 is never needed to be escaped.

Referring to FIG. 4, the frame format of the present invention consists of a one byte opening flag 68, a one, two or two hundred sixty two byte frame data section 70, three bytes for the frame check sequence 110 and one byte closing flag 74.

Referring to FIG. 5, all frames start and end with a flag byte having a flag character 76 with a bit sequence of one zero bit followed by six contiguous one bits followed by a zero bit. The flag pattern of FIG. 4 preceding the control field 104, FIG. 3B, is defined as the opening flag 68. The flag pattern following the Frame Check Sequence (FCS) field 110 is defined as the closing flag 74. One or more flags is acceptable for either an opening flag 68 or a closing flag 74. The closing flag 74 of one frame may selectively be the opening flag 68 of a subsequent frame.

Referring to FIG. 6, in the Link Setup Frame, or L-frame, 78 the "type" field 80 identifies the frame type. The frame types for the L-frame 78 are SABM (set asynchronous balanced mode), UA (unnumbered acknowledgement) and DISC (disconnect). The channel identification field or "ch_id" field 82 indicates a destination channel which is always zero for L-frames. The L-frame size in the preferred embodiment is six bytes (one opening flag byte, one control byte, three FCS bytes and one closing flag byte).

Referring to FIG. 7, the supervisory frame or S-frame 84 is shown in which the "type" field 80 identifies the frame type, and "ch_id" field 82 indicates a destination channel. The "Ack_mid" field 86 of the second control byte is the last tx_mid 94 of the sending or transmitting device that the receiving device has successfully received in case of ACK, or that the receiver has failed to receive (out of sequence or Receive Frame Timeout) in case of NACK. The tx_mid represents the message identification of the data being transmitted. The ACK represents ACKnowledge, a control code or designation of a positive acknowledgement. The ACK control code is sent from a receiver to a transmitter to indicate that a transmission or sequence of transmission is received correctly. NACK represents a negative ACKnowledge, a control code or designation for a negative acknowledgement. The negative ACKnowledge is sent from a receiver to a transmitter to indicate that a transmission, or sequence of transmissions, has failed. The S-frame 84 size is seven bytes (one opening flag byte, two control byte, three FCS bytes and one closing flag byte).

Figure 8:
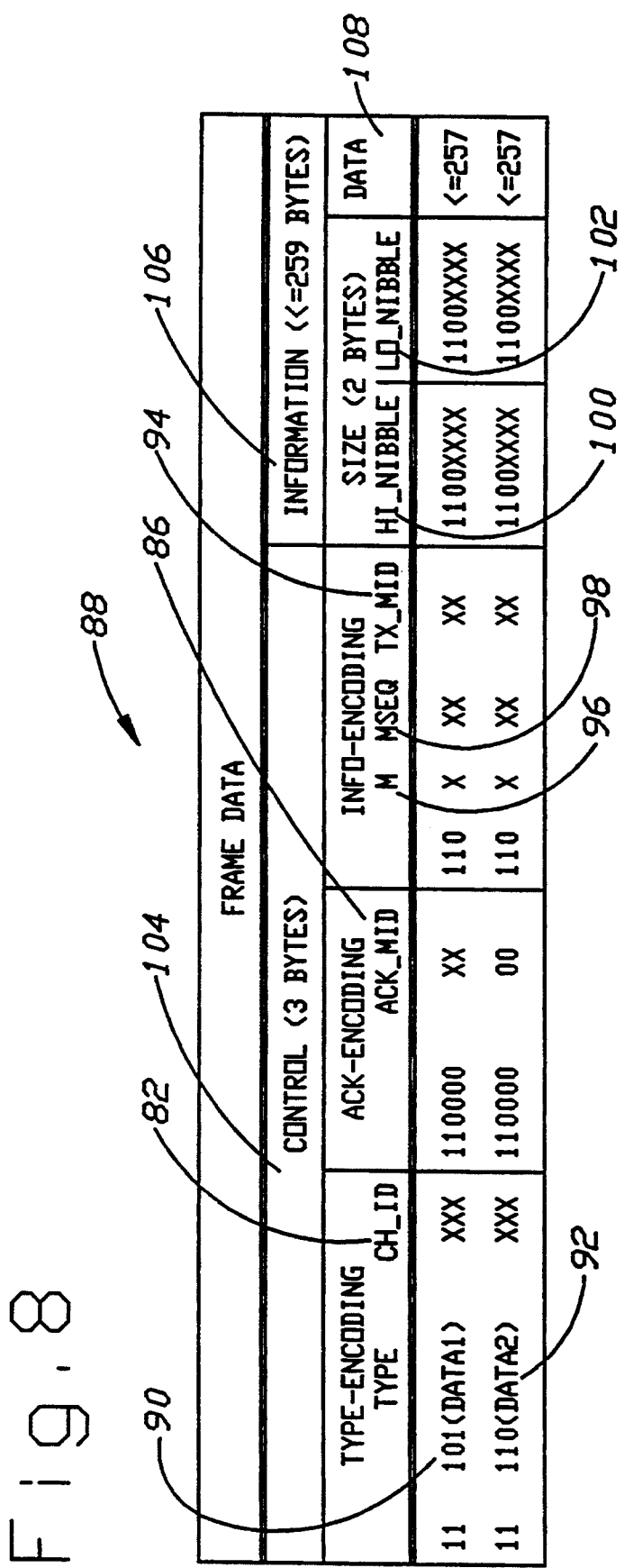
FIG. 8 is an illustration of the preferred frame format for an informational frame.

Referring to FIG. 8, the format of an informational frame or I-frame 88 is shown in which: DATA one 90 is an I-frame with an ACK transmitted or piggybacked, DATA two 92 is an I-frame without ACK piggybacked. The "type" field 80 identifies the frame type as being either a data one type 90 or a data two type 92. The channel identification or "ch_id" field 82 indicates destination channel. The "ack_mid" 86 field of the second control byte is the last transmitted message "tx_mid" 94 of the sender that the receiver has successfully received in case of ACK piggybacked.

The More bit or "M" field 96 of the third control byte indicates whether or not the frame is the last frame of a message. The "mseq" field 98 represents a frame sequence number within a message. The "tx—mid" field 94 of the third control byte indicates the message id of the sender which is associated with the I-frame 88. The "hi—nibble" 100 of the first size byte contains the high-order four bits of the nine-bit size, and the "lo—nibble" 102 contains the low-order five bits of the nine-bit size. The minimum size of an I-frame 88 is ten bytes (one opening flag byte, three control byte, two size bytes, no data bytes, three FCS bytes and one closing flag byte). The maximum size of an I-frame 88 in the preferred embodiment is two hundred sixty-seven bytes (one opening flag byte, three control bytes, two size bytes, two hundred fifty-seven data bytes, three FCS (frame check sequence) bytes and one closing flag byte).

The one to three byte control field 104 indicates a frame type 80, channel id 82, message id to be ACK-'ed/NACK'ed 86, More bit 96, and frame sequence number 98 within a message id 94. Bits six and seven are set to one in all three bytes to insure the field never needs to be escaped. The size of the control field for L-Frames 78, FIG. 6, is one. The size of the control field for S-Frames 84, FIG. 7, is two. The size of the control field 104, FIG. 8, for I-Frames 88 is three. In the information field 106 of the I-Frame 88 of FIG. 8, the size field 105 is two bytes of which nine bits are used to determine the data length. The range is from zero through two hundred fifty-seven. The first byte in the high nibble field 100 contains bits five through eight of the length and the second byte in the low nibble field 102 includes bits zero through four of the length. Bits six and seven of both bytes are set to one thus insuring that the size field never needs to be escaped.

The data field 108 contains data which is of the ASCII or binary format. It contains the packetized application message that the applications want to transmit and receive. The maximum length of two hundred fifty-seven prevents long messages from dominating the bandwidth of the link. The format of this data is application dependent. By definition, the data field does not include any escape characters 118 of FIG. 10 which are added during transmission or deleted during reception.

Referring to FIG. 9, the FCS (frame check sequence) field 110 contains a sixteen-bit frame check sequence calculated from the control field 104, size field 105 and data field 108. The FCS field 110 is three bytes in length. The first byte 112 of the FCS contains bits eleven through fifteen of the FCS, the second byte 114 contains bits ten through six of the FCS, and the third byte 116 of the FCS contains bits five through zero of the FCS. Bits six and seven of each byte are set to one to insure that the FCS field never needs to be escaped. All other unused bits are set to zero. The algorithm used to compute to FCS 110 in the preferred embodiment is based on CRC-16, a fast multiplication type algorithm, but using a look-up table instead of multiplication to reduce run-time execution. The CRC-16 represents a cyclic redundancy check, a basic error checking mechanism to generate a sixteen-bit checksum. The FCS computation is performed by applying each character to the algorithm, building on to the sixteen-bit FCS. The look-up table generated is preferably based upon the CRC-16 reverse polynomial is extracted from FIGS. 19–15 on page 548 of the "C Programmer's Guide to Serial Communications", Joe Campbell, published by Howard W. Samms & Company.

Referring to FIG. 10, the escape character table 118 is shown having flag characters embedded in the IN-FORMATION stream that are prefixed by an escape (0x85) and with their bits inverted (0x81). Escapes embedded in the INFORMATION stream are prefixed by an escape (0xB5) with their bits inverted (0x4A). This serves the same purpose as zero bit insertion and deletion. The ASCII escape character (0x1B) is not used in the preferred embodiment because of the possibility that an ASCII escape character will be part of the actual data. A character is selected which has a unique bit pattern (a non-ASCII character).

The control of the message and frame flow is accomplished by the receiving device notifying the transmitting device by transmitting an ACK upon receiving a "no-more-data" indication OR when window size (4) frames have been received. The ACK specifies the last/current message id successfully received (by logical channel). Message id 96, FIG. 8, and frame sequence numbers 98 are used to identify lost frames by channel. Frames containing an invalid FCS 110 are discarded, causing an out-of sequence event to occur upon arrival of the next frame on that channel. Any time a receiving side detects a frame out of sequence (by logical channel), a NACK is generated for each message containing the message id that was expected and not received.

The applications selectively "block" the application message into blocks of 1028 bytes each. This provision provides the highest level of flow control as well as implementation dependency where a long message is not accommodated due to a limitation in hardware memory. These blocks are further divided into four 257-byte maximum frames. The last frame of the last block of a message has a zero "M"bit value, all others have a one as a bit value. The M-bit field 96 of the information frame 88, FIG. 8, contains a zero upon the informational frame being the last frame of a message. The more field 96 of the informational frame 88 contains a one when one or more frames of a message are coming. No frame contains data for more than one message.

The seven frame types defined are: SABM (set asynchronous balanced mode), UA (unnumbered acknowledgement), DISC (disconnect), ACK (Acknowledge), NACK (Negative Acknowledge), DATA1 and DATA2. Link establishment begins when the IST 56, FIG. 2, transmits a SABM command frame. If the telecommunication system 40 acknowledges the SABM (with UA), the link 58 is available for information transfer. SABM, UA and DISC command frames are transmitted on the commands channel. A SABM frame is transmitted from only the IST side: a UA frame is transmitted only from the system 40 side; a DISC frame is transmitted by either side.

The protocol layer 62, FIG. 3, provides for multiple outstanding frames by logical channel. A sender transmits a full window (4) of frames per logical channel without waiting for an acknowledgement. An ACK is sent whenever a frame with the M-bit 96, FIG. 8, set to zero is received or whenever an in-sequence frame with a frame sequence number 110 of three is received. A NACK is sent for each frame that occurs out of sequence.

The protocol 62, FIG. 3, incorporates acknowledgement timers on both the telecommunication system 40, FIG. 2, and the IST 56. The sending side activates the acknowledgement timer per block of data (of message) transmitted to the receiving side. The timeout value of this timer is minimally the amount of time required to transmit four frames (window size) and to receive an ACK for the fourth frame. The reception of the ACK-/NACK within the time-out interval prevents the time-out from occurring. Upon an acknowledgement time-out, the protocol 62, FIG. 3, assumes the acknowledgement was lost, and then it informs the application (if required) of the error.

The protocol also incorporates a receive frame timer on both the system 40 and the IST 56, FIG. 2. The receiving side activates the receiver frame timer per logical channel upon receiving a frame whose M-bit 96, FIG. 8, is set to 1 (one). This time-out value must account for the amount of time required to receive the next frame keeping in mind that the other channels are currently in use. Reception of the next frame within the time-out interval causes the timer to be stopped (or reactivated from zero if the M-bit is set). This timer is used to detect a frame loss.

The time-out values used must either be:
1. Compatible with any baud rate the PDI 54 port is configured to, or
2. Dynamic—changes accordingly when baud configuration changes.

Transmission Error Handling:

Regardless of the error condition, retransmissions are not supported in the preferred embodiment, thus the protocol layer 62, FIG. 3, is not responsible for insuring an errorfree link. The protocol is responsible for insuring that the appropriate application processes on either side of the data link 58, FIG. 2, are informed (if required) in the event of an error (NACK'ed or lost frames). The sending side is able to detect error situations (through time-outs or NACK's) and for which message/channel/application the error applies. The protocol processes (on both sides) are responsible for coordinating the appropriate actions with their applications in the event of transmission errors.

Figure 11:
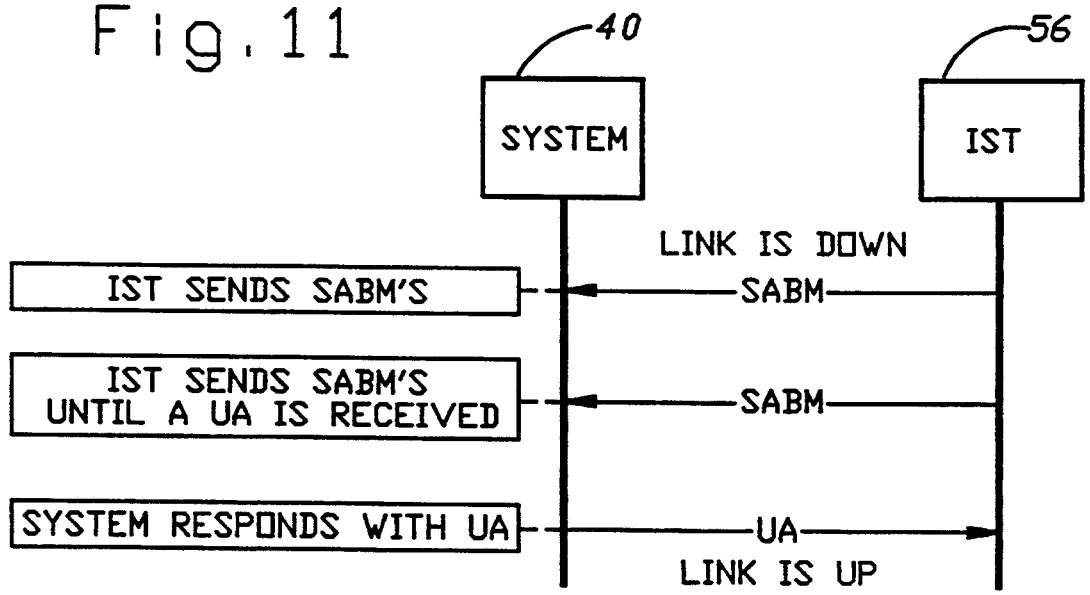
FIG. 11 is an illustration of intercommunication between the CPU of the telecommunication system and the IST of FIG. 2 during power-up link establishment.

Referring to FIG. 11, the IST 56 transmits a SABM (Set Asynchronous Balanced Mode) command frame to the telecommunication system 40 to establish a link. If the system 40 acknowledges the SABM (with UA) the link is available for information transfer. The SABM, UA and DISC command frames are transmitted on the commands channel. A SABM frame is transmitted only from the IST. A UA (unnumbered acknowledgement) frame is transmittable only from the system 40 side. A DISC (disconnect) frame is transmitted by either side.

Figure 12:
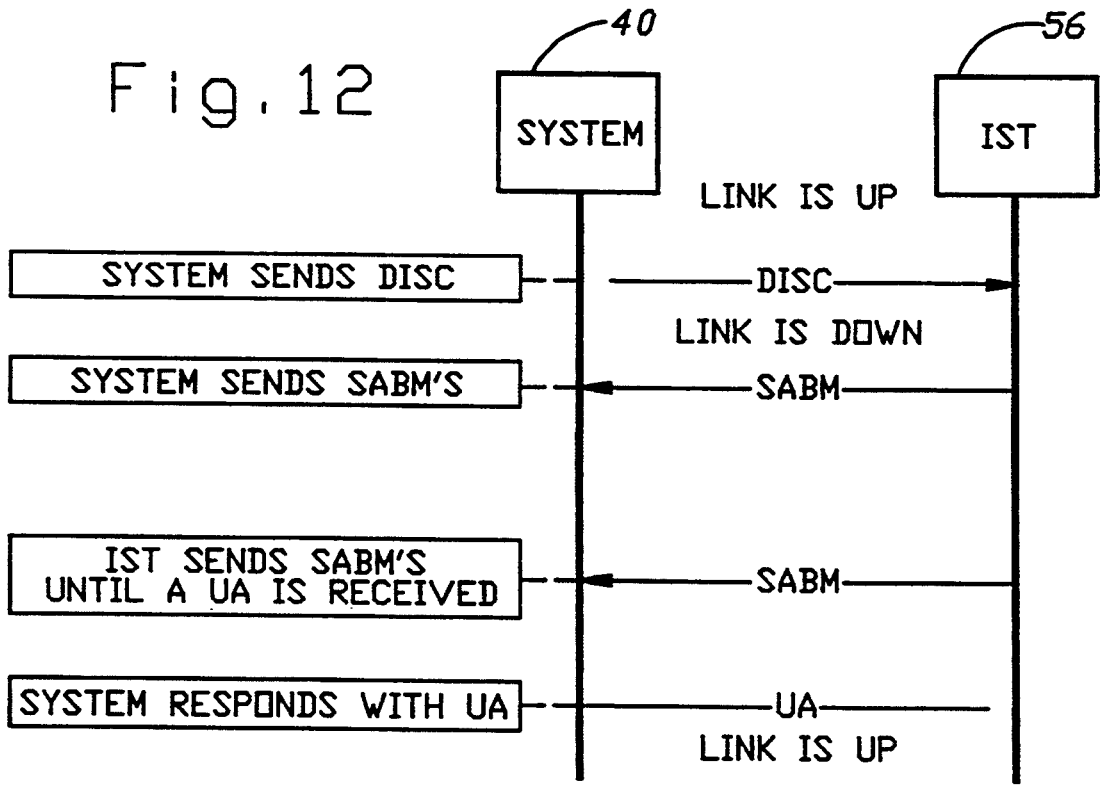
FIG. 12 is an illustration of the intercommunication between the CPU and the IST for FIG. 2 when the system initiates link disconnect.

Referring to FIG. 12, the telecommunication system 40 is shown indicating a link disconnection. The link disconnect occurs in response to the system sending a DISC frame. Link re-establishment subsequently begins upon the IST 56 sending an SABM followed by a UA response from the system 40.

Figure 13:
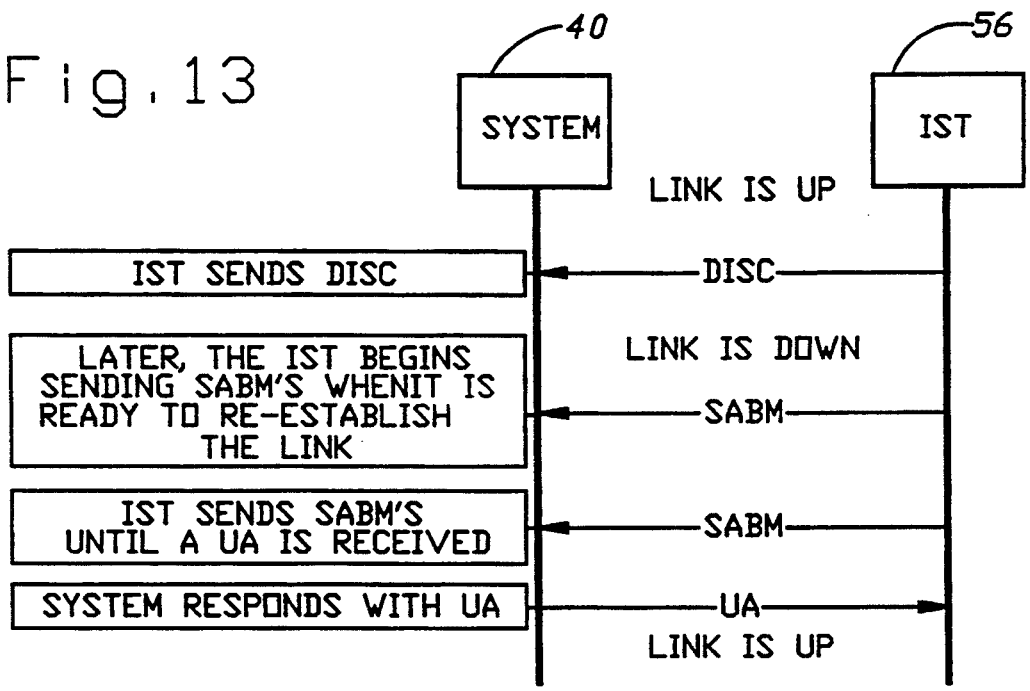
FIG. 13 is an illustration of the intercommunication between the CPU of the telecommunication system and the IST when the IST initiates link disconnect.

In FIG. 13, the IST 56 is shown indicating the link disconnection. The link disconnect occurs as with a system linked disconnect by the system 40 sending a DISC frame to the IST 56. Link re-establishment begins in response to the IST 56 sending an SABM followed by a UA signal from the system 40.

Figure 14:
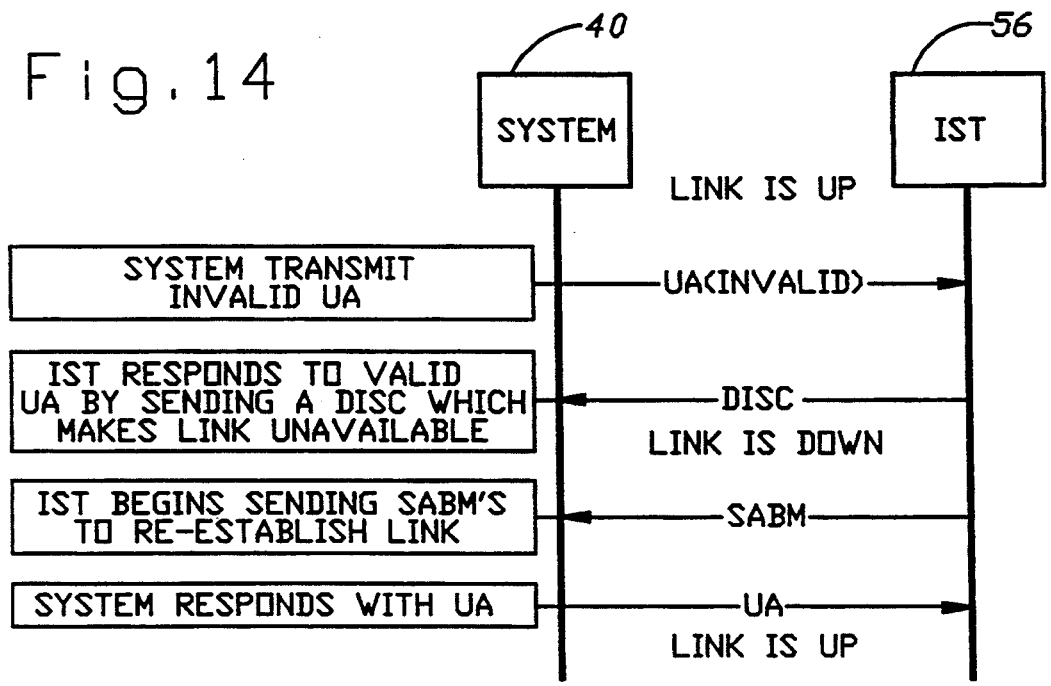
FIG. 14 is an illustration of intercommunication between the CPU of the telecommunication system and the IST of FIG. 2 when the CPU transmits an invalid UA frame.
Figure 15:
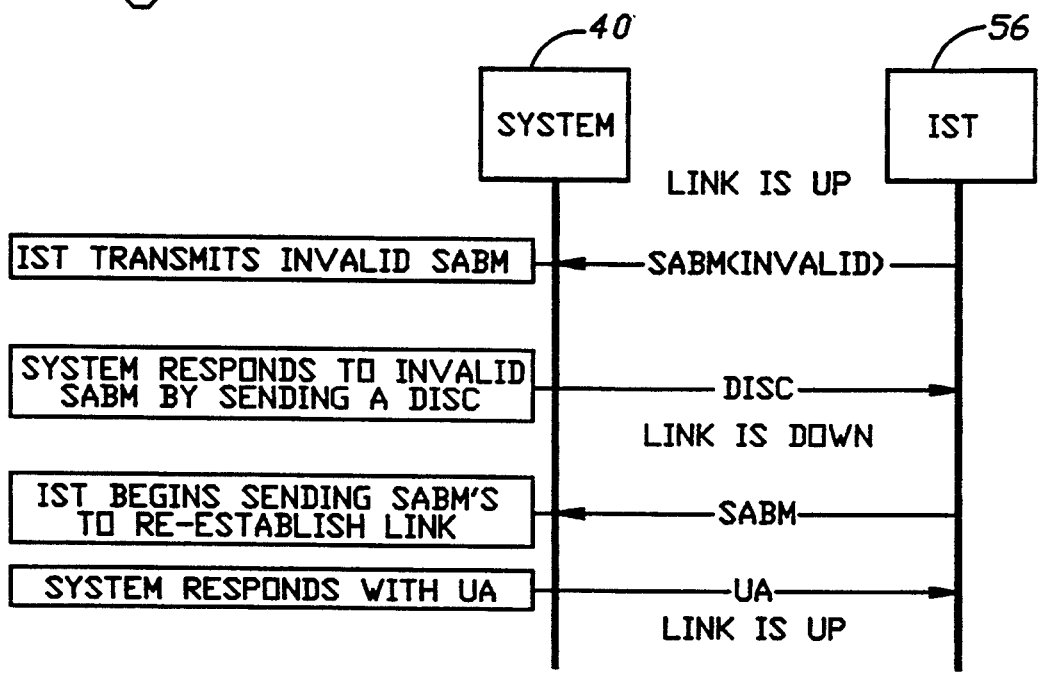
FIG. 15 is an illustration of the intercommunication between the CPU of the telecommunication system and the IST of FIG. 2 when the IST transmits an invalid SABM frame.

Referring to FIG. 14, the transmission of an invalid UA frame by the system 40 is shown. The reception of the invalid link setup frame (UA frame) causes the IST to transmit a DISC frame to allow the link to be re-established. FIG. 15 illustrates the transmission of an invalid SABM frame from the IST 56 to the system 40. The reception of an invalid SABM link setup frame by the system 40 causes the system to transmit a DISC frame, allowing the link to be re-established.

Figure 16:
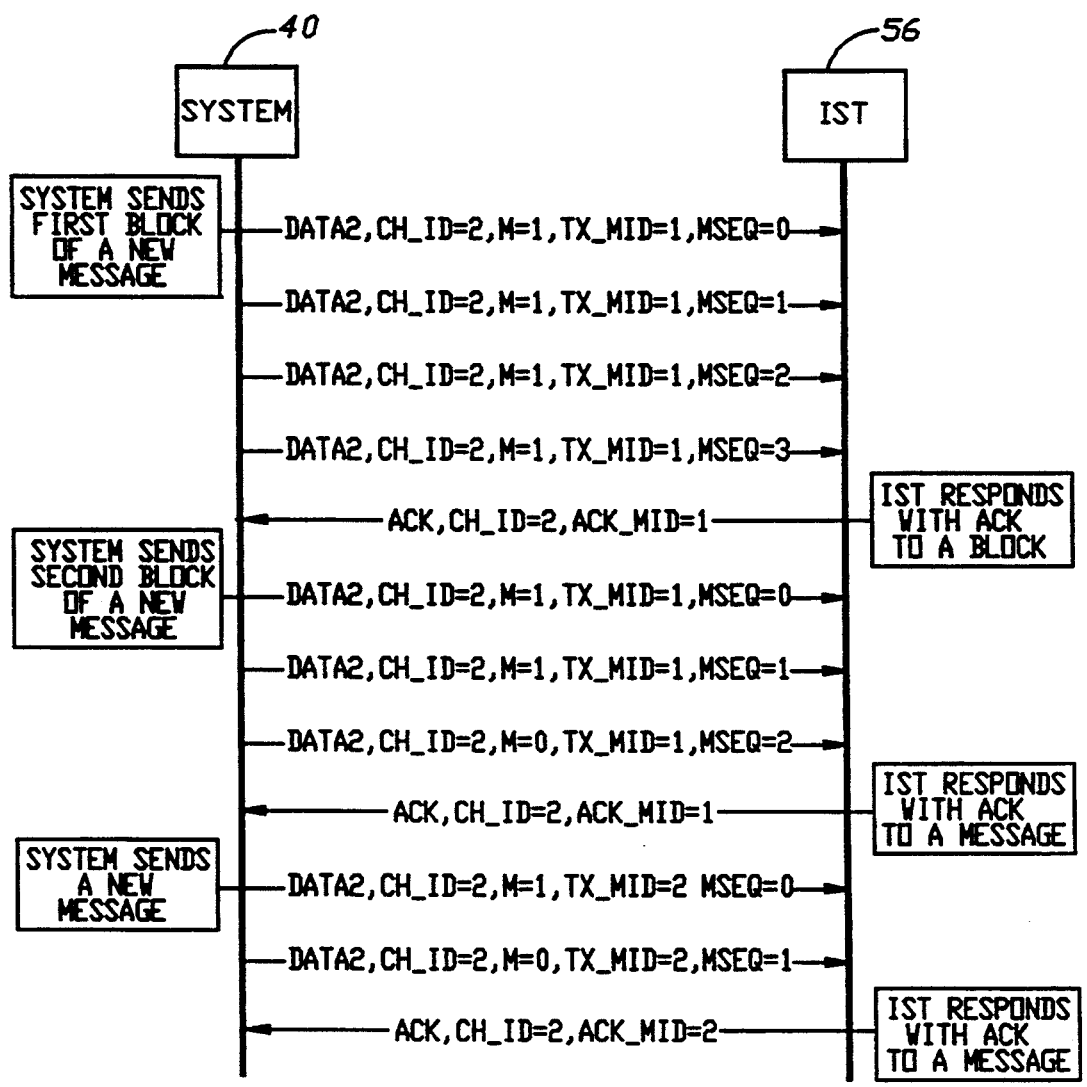
FIG. 16 is an illustration of the intercommunication between the CPU of the telecommunication system and the IST of FIG. 2 when there are multiple frame messages transmitted on a single channel.

FIG. 16 illustrates an example of message transmission between the telecommunication system 40 and the IST 56 on the same logical channel. The system 40 breaks a message into two blocks and transmits the first block (four frame in the maximum window size) and waits for an acknowledge. The IST 56 acknowledges the block which signals the system 40 to send the second block containing the three remaining frames of the message. The second message sent by the system 40 contains only two frames indicated by the zero M-bit 96, FIG. 8, in the second frame causing the IST to Acknowledge the message.

Figure 17:
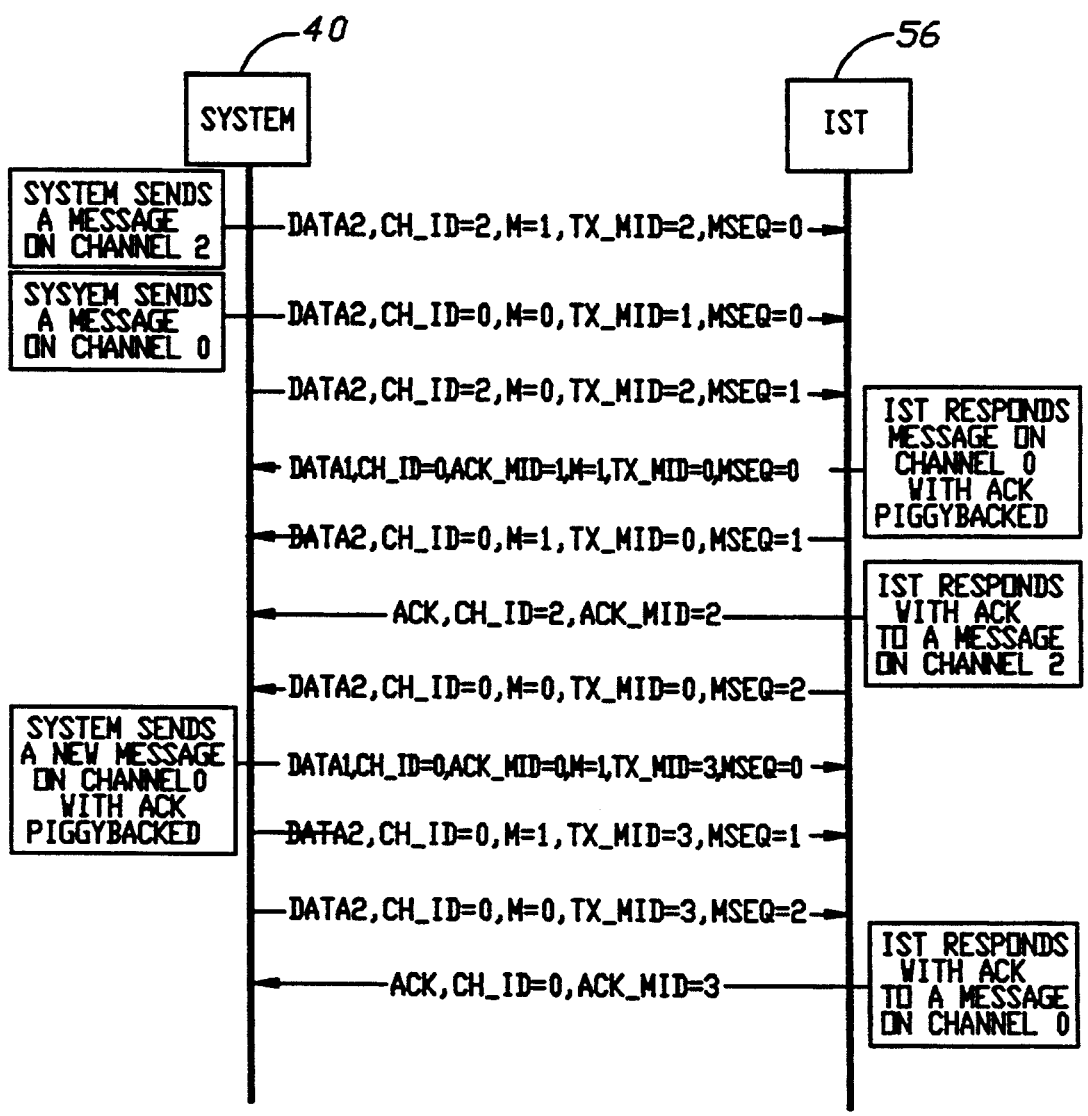
FIG. 17 is an illustration of the intercommunication between the CPU of the telecommunication system and the IST of FIG. 2 when there is are multiple frame messages transmitted on multiple channels and the ACK code is "piggybacked"

Referring to FIG. 17, an example involving the transmission of messages from both devices is shown using multiple channels. The system 40 sends the first frame of data message id 2 on channel two. The system 40 sends the frame of single frame data message id 1 on channel zero. The telecommunication system 40 sends the final frame of data message id 2 to the IST 56 on channel two. The IST 56 sends a data message on channel zero with the ACK of message id 1 piggybacked. The IST 56 sends data message id 0 on channel zero followed by an ACK on channel two for message id 2 to the system 40. The IST 56 sends the final frame on channel zero for data message id 0. The system 40 responds with data message id 3 with a ACK for message id on channel zero. The last two frames of data message id 3 are sent by the system 40 on channel zero causing the IST 56 to send the corresponding ACK control code indicating the correct set of transmissions.

Figure 18:
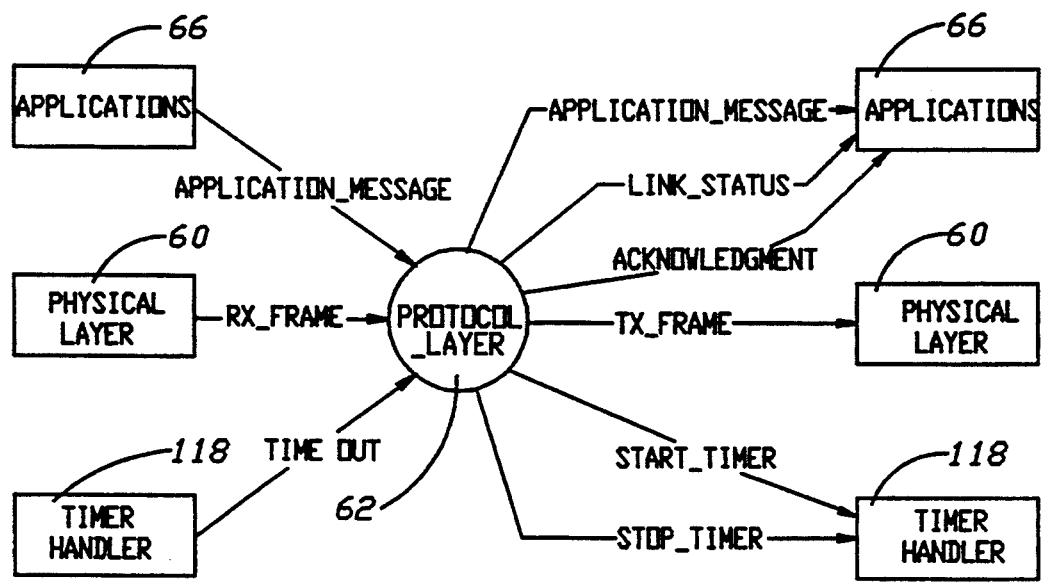
FIG. 18 is a top level data flow context diagram of the protocol layer of FIG. 3A.

FIG. 18 illustrates the top level data flow diagram inputting data to the protocol layer 62 and output data from the protocol layer. The protocol layer 62 interfaces with the application 66, physical layer 60 and time handler 118 external entities.

Figure 19:
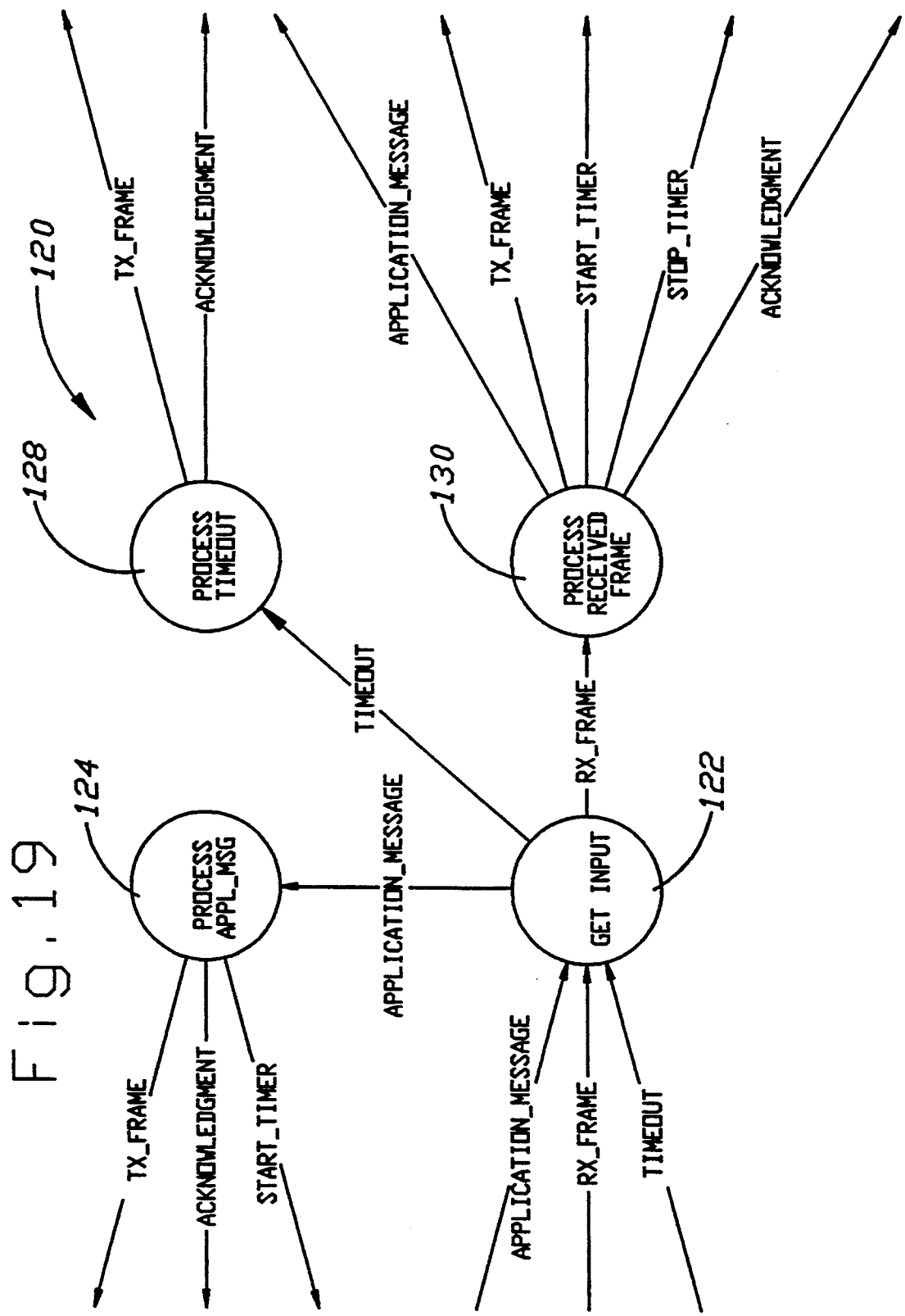
FIG. 19 is a level one data flow overview diagram illustrating the first level functional decomposition of the protocol layer of FIG. 3A.

Referring to FIG. 19, the level 1 data flow diagram 120 represents the first level functional decomposition of the protocol layer. The functionality of the protocol layer is broken into four subfunctions: get input 122, process appl_msg 124, process timeout 128 and process received frame 130. Each subfunction has a well defined functionality of its own: getting input from the applications or from the physical device or from the times, processing application data received from applications, processing timeouts and processing frame received through the physical device. Depending on the magnitude of each subfunction, a subfunction is decomposed further and further until it reaches well defined and compact subfunctions.

Figure 20:
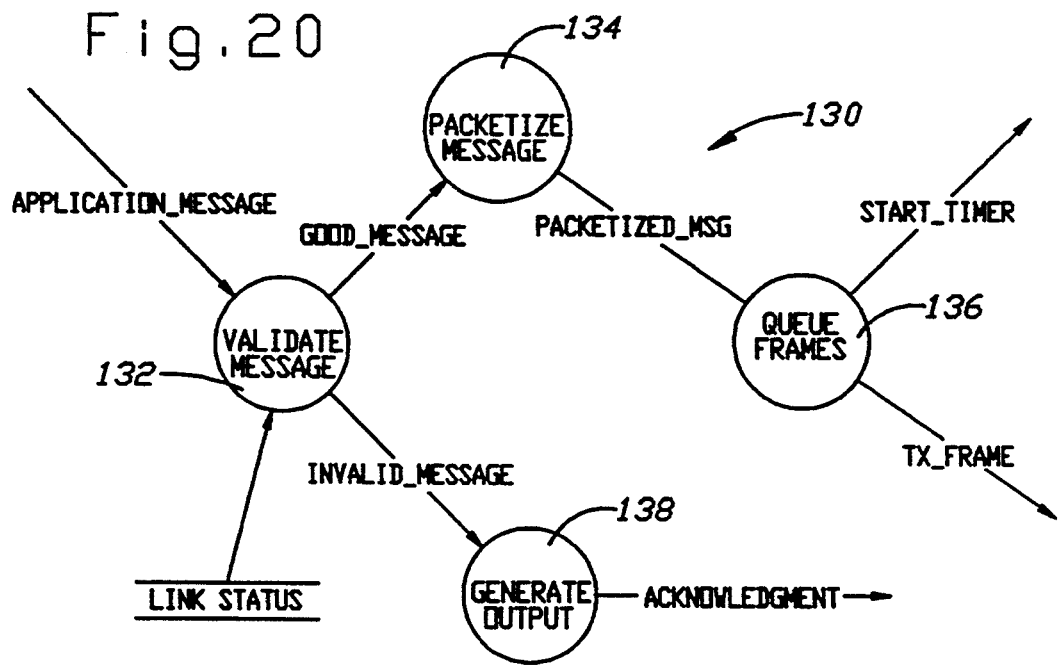
FIG. 20 is the level two data flow diagram of the application message handling of the protocol layer of FIG. 3A.

Referring to FIG. 20, the level 2 data flow diagram 130 for application message handling is spawned from the process appl_msg subfunction 124 of the level 1 data flow diagram of FIG. 19. The application message handling data flow diagram of level 2 illustrates the second level functional decomposition of the application message handling function. The function is broken down into four subfunctions: validating application messages 132, packetizing validated messages 134, putting packetized data into a queue for transmission 136, and generating acknowledgement to the applications 138.

Figure 21:
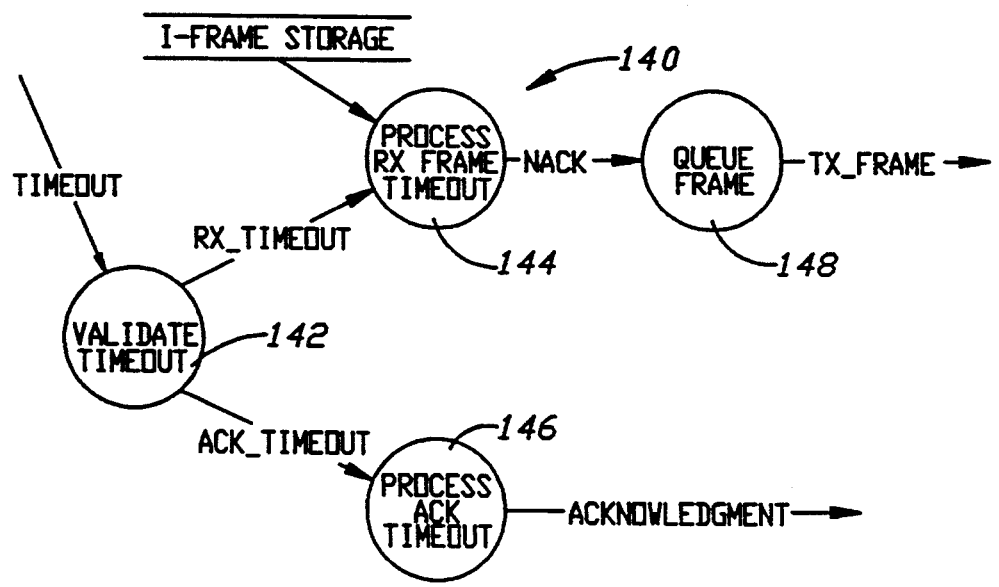
FIG. 21 is a level two data flow diagram of the time-out handling of the protocol layer of the FIG. 3A.

Referring to FIG. 21, the level two data flow diagram for timeout handling 140 is spawned from process timeout 126 of the level two data flow diagram of FIG. 19. The timeout handling data flow diagram 140 of FIG. 21, illustrates the second level functional decomposition of the timeout handling function. The function is broken into four subfunctions: validating a timeout 142, handling a received frame timeout 144, handling an ACK timeout 146, and putting NACK into a queue for transmission 148.

Figure 22:
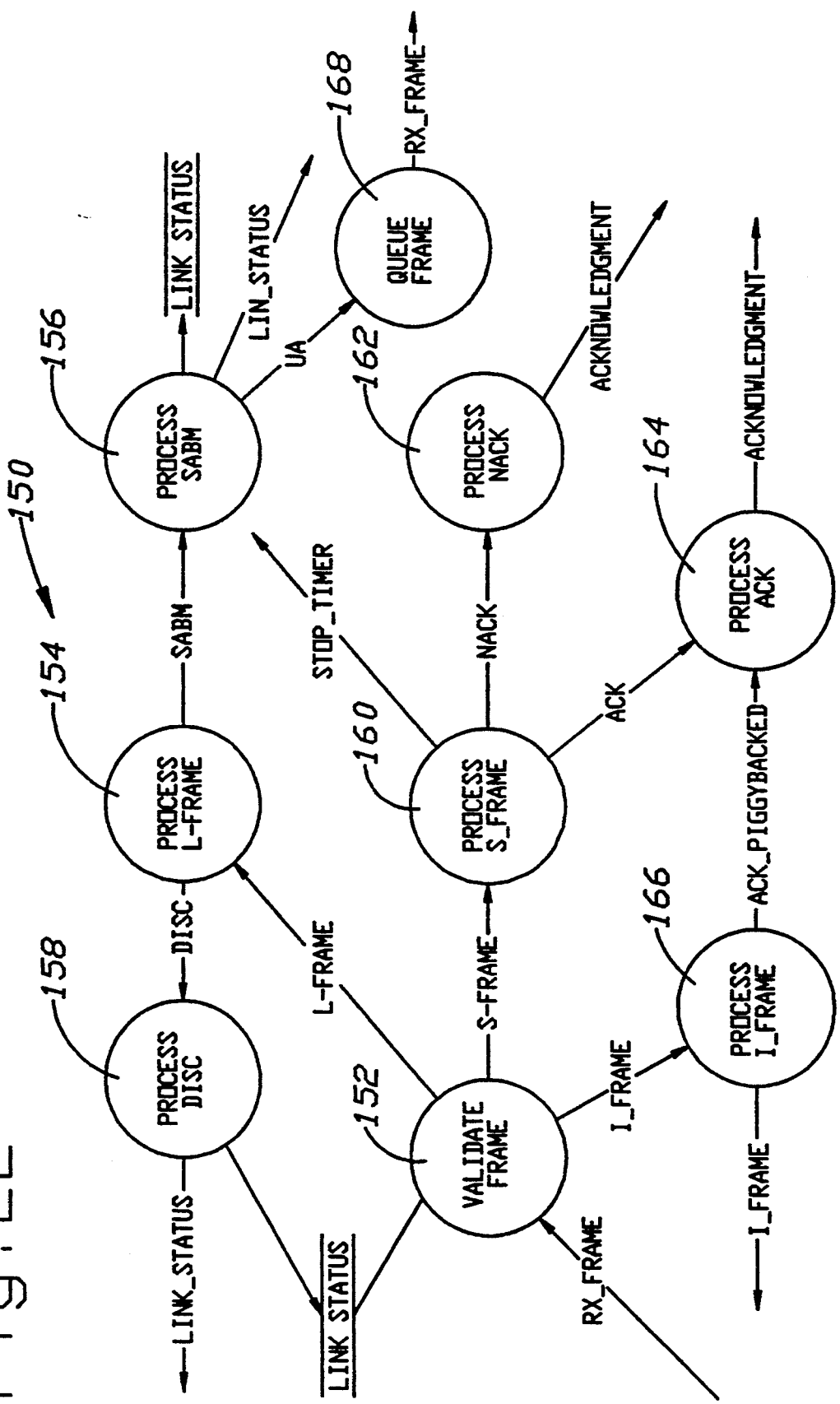
FIG. 22 is a level two data flow diagram of the received frame handling of the protocol layer of FIG. 3A.

Referring to FIG. 22, the level 2 data flow diagram for received frame handling 150 is spawned from the process received frame 128 of the level 1 data flow diagram of FIG. 19. The received frame handling diagram 150 of FIG. 22, illustrates the second level functional decomposition of the received frame handling function. The received frame handling function is broken into nine subfunctions: validating a received frame 152, processing a validated link setup frame 154, processing a received SABM frame 156, processing a received DISC frame 158, processing a validated supervisory frame 160, processing a received NACK frame 162, processing a received ACK frame 164, processing a received information frame 166, and putting a response data into a queue for transmission 168.

Figure 23:
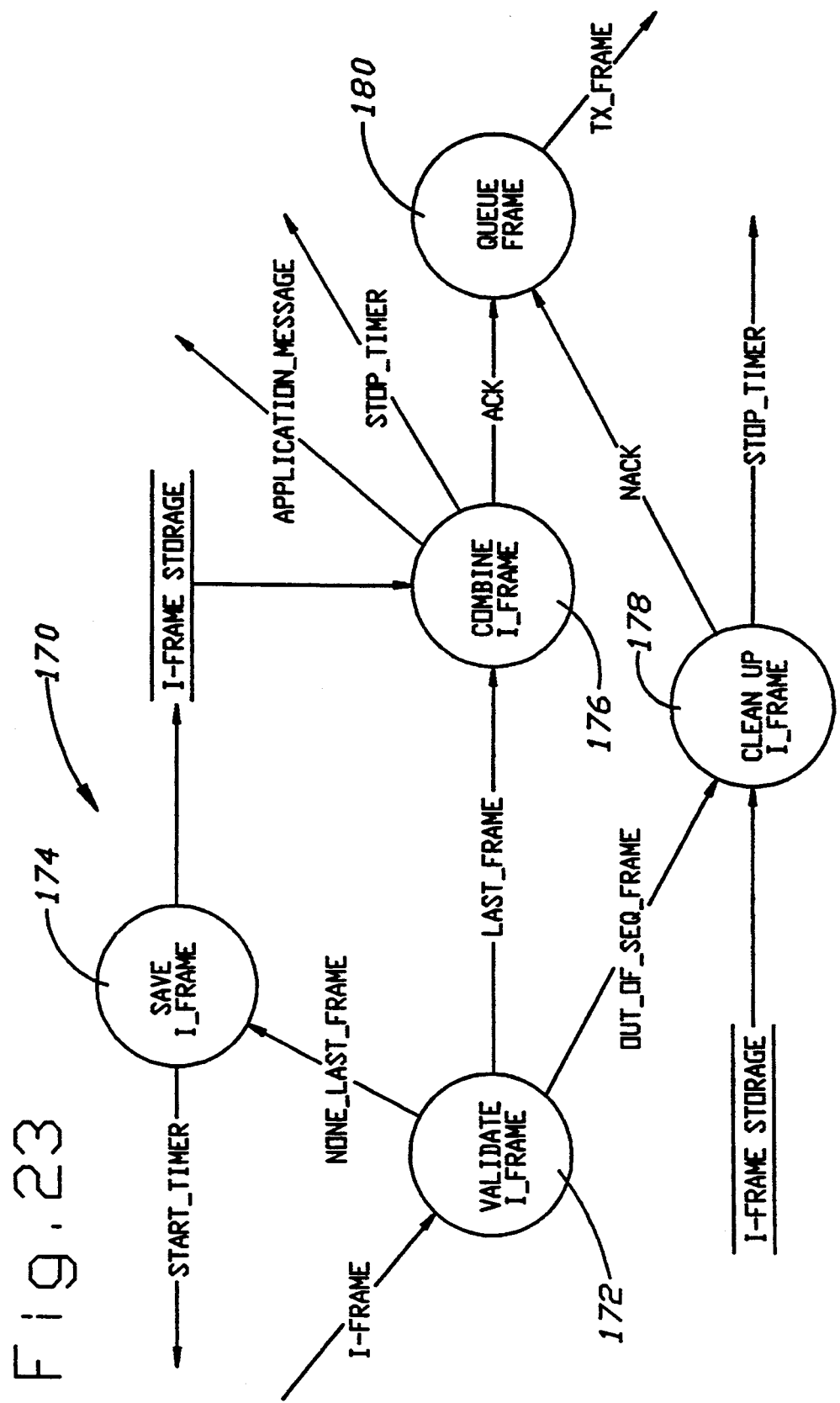
FIG. 23 is a level three data flow diagram of received informational frame handling of the protocol layer of FIG. 3A.

Referring to FIG. 23, the level 3 data flow diagram for received information frame (I-frame) handling 170 is spawned from process I-frame 166 of the level 2 received frame handling data flow diagram of FIG. 22. The received I-frame handling diagram 170 of FIG. 20, illustrates the third level functional decomposition of the receiving information frame handling function. The received I-frame handling function is broken into five subfunctions: validating a received information frame 172, storing a validated information frame in case of more data coming 174, combining received information frames in case of a completed information message received 176, cleaning up received frame storage in case of error 178 and putting a response data into a queue for transmission 180.

While a detailed description of the preferred embodiment of the invention has been given, it should be appreciated that many variations can be made thereto without departing from the scope of the invention as set forth in the appended claims.

We claim:

1. In a telecommunication system with a multiport switch controlled by central processing unit to interconnect telephone calls received from telephone units of an external network with an internal network of agent telephonic units connected with the multiport switch and in which the central processing unit communicates data with an information support computer terminal on a single, asynchronous, data communications link, a communication protocol method for communicating on said communication link, comprising the steps of:

establishing a multilayered compressed OSI Model Protocol in which the functions of the OSI Model protocol layers respectively entitled Data Link, Network, Transport and Session are combined into a single protocol layer; and communicating on said asynchronous communication link in accordance with the multilayered compressed protocol.

2. The communication protocol method of claim 1 in which said step of communicating includes the steps of transmitting frames of information with a plurality of different fields respectively associated with different types of information arranged in a preselected frame format including at least one of a type field for identifying the frame type of the frame being transmitted, a channel identification field for indicating a destination channel to which the message is to be conveyed, a message data identification field for indicating the last message identification received, a more field for indicating whether the frame of information is the final frame of the message identified in the message field, a frame sequence field for indicating the portion of the frame being transmitted in a sequence of frames which comprise the message identified in the message field, a message identification field for identifying the message with which the frame being transmitted is associated, a size field for indicating the size of the data field and a data field having a size identified by the size field, and including a field check sequence field for indicating information used to check for accurate receipt of the message.

3. The communication protocol method of claim 2 in which said step of communicating includes the steps of transmitting information in all of said fields.

4. The communication protocol method of claim 2 in which the size field has a high nibble section representation of the most significant bits of the data field size and a low nibble section for representation of the least significant bits of the size field.

5. The communication protocol method of claim 1 in which said step of establishing a multilayered compressed protocol includes the step of establishing three different types of frames including at least one link frame, at least one supervisory frame and one informational frame.

6. The communication protocol method of claim 5 in which only the following three link frames are established to create a communication connection: a set asynchronous balanced mode link frame to request a link, an unnumbered acknowledgment link frame to acknowledge establishment of link connection and a disconnect link frame to indicate disconnection of the link.

7. The communication protocol method of claim 5 in which two types of supervisory frames are established including an ACK type frame to indicate correct receipt of a message and a NACK frame to indicate incorrect receipt of a message.

8. The communication protocol method of claim 5 in which two types of informational frames are established including a DATA 1 frame having a preselected message identification and a DATA 2 frame with a variable message identification field.

9. The communication protocol method of claim 8 in which two types of supervisory frames are established including an ACK type frame to indicate correct receipt of a message and a NACK frame to indicate incorrect receipt of a message.

10. The communication protocol method of claim 9 in which three link frames are established including a SABM-type link frame to request a link, a UA-type link frame to acknowledge establishment of link connection and a DISC-type link frame to indicate disconnection of a link.

11. In a telecommunication system with a multiport switch controlled by a central processing unit to interconnect telephonic calls received from telephone units of an external network with an internal network of agent telephonic units connected with the multiport switch and in which the central processing unit communicates data with an information support computer terminal on a single, asynchronous, data communications link, a communication protocol method for communicating on said communications link, comprising the steps of:

transmitting a frame of information with size bytes indicating the size of a variable size data field; and transmitting the frame with data within the variable size data field having a size corresponding to that indicated by the size byte.

12. The communication protocol method of claim 11 including the step of transmitting a message identification number with the frame associated with the data in the data field.

13. The communication protocol method of claim 11 including the steps of transmitting a message indicating an acknowledgement of correct receipt of the frame, and transmitting an identification number of the last message transmitted form which the acknowledgement of correct receipt was obtained.

14. The communication protocol method of claim 11 including the step of transmitting an indication of in which one of a plurality of types of informational frames is the data being transmitted.

15. The communication protocol method of claim 11 in which one of the types of informational frames includes means for "piggybacking" an acknowledgement signal with the data in the data field.

16. The communication protocol method of claim 11 including the step of transmitting a frame sequence number indicating a position of the informational frame in a sequence of frames carrying a message.

17. The communication protocol method of claim 11 including the step of transmitting a more code to indicate more frames of data will follow the frame of information being transmitted.

18. The communication protocol method of claim 11 in which there are two size bytes for respectively identifying the least most significant digits and the most significant digits of the size of the data field.

19. The communication protocol method of claim 11 including the step of comparing the size of the data field with the size identified by the size field to determine whether the data was correctly received.

20. In a telecommunication system with a multiport switch controlled by a central processing unit to interconnect telephonic calls received from telephone units of an external network with an internal network of agent telephonic units connected with the multiport switch and in which the central processing unit communicates data with an information support computer terminal on a single, asynchronous, data communication link, a communication protocol method for communication on said communications link, comprising the steps of:

transmitting an informational frame of data with a message number corresponding to a single message being conveyed by a plurality of informational frames; and transmitting the informational frame of data with a frame sequence number representing the position of the informational frame in the plurality of informational frames which comprise the message.

21. The communication protocol method of claim 20 including the step of transmitting a number representation of the last message received correctly.

22. The communication protocol method of claim 20 including the step of transmitting four informational frames in each sequence of frames.

23. The communication protocol method of claim 20 including the step of transmitting with said informational frame at least one of the fields of an informational frame type number, a channel identification number, a number including the last message correctly transmitted, and a data field size number.

24. The communication protocol method of claim 23 including the step of transmitting all of said informational fields.

25. The communication protocol method of claim 20 including the step of transmitting with the informational frame a more code including whether there will be more frames transmitted for the message identified by said message number.

26. In a telecommunication system with a multiport switch controlled by a central processing unit to interconnect telephonic calls received from telephone units of an external network with an internal network of agent telephonic units connected with the multiport switch and in which the central processing unit communicates data with an information support computer terminal on a single, asynchronous, data communications link, a communication protocol method for communications on said communications link, comprising the steps of:

transmitting a flag at the beginning of the frame of information;

transmitting the frame of information with a plurality of different fields respectively associated with different types of information arranged in a preselected frame format including a frame type field for identifying the frame type of the frame being transmitted, a channel identification field for indicating a destination channel to which the message is to be conveyed, a last message data identification field for indicating the last message identification received, a frame sequence field for indicating the portion of the frame being transmitted in a sequence of frames which comprise the message identified in the message field, a message identification field for identifying the message with which the frame being transmitted is associated, a size field for indicating the size of the data field, a data field having a size identified by the size field; and transmitting another flag at the end of the frame of information.

27. The communication protocol method of claim 26 in which there are three different types of link frames identifiable by the frame type field in which the last message field, the more field, the frame sequence field, the message identification field and the size field and the data field are empty.

28. The communication protocol method of claim 27 in which the three different types of link frames are a set asynchronous balanced mode frame, a unnumbered acknowledgement frame and a disconnect frame.

29. The communication protocol method of claim 26 in which there are two different types of supervisory frames identifiable by the frame type field in which the more field, the frame sequence field, the message identification field and the size field and the data field are empty.

30. The communication protocol method of claim 29 in which the two different types of supervisory frames are an acknowledge frame and a negative acknowledge frame.

31. The communication protocol method of claim 26 in which there are two different types of informational frames identifiable by the frame type field including one type on which an acknowledge field type information is piggybacked on said one type of informational frame.

32. The communication protocol method of claim 26 including the step of transmitting the frame of information with a more field for indicating whether the frame of information is the final frame of the message identified in the message field.

33. The communication protocol method of claim 32 including a field for indicating information used to check if the information has been correctly received.

* * * * *